(12) United States Patent
Heaton

(10) Patent No.: US 9,185,893 B1
(45) Date of Patent: Nov. 17, 2015

(54) FISHING REEL

(71) Applicant: Danny A. Heaton, Watertown, SD (US)

(72) Inventor: Danny A. Heaton, Watertown, SD (US)

(*) Notice: Subject to any disclaimer, the term of this patent is extended or adjusted under 35 U.S.C. 154(b) by 135 days.

(21) Appl. No.: 14/021,575

(22) Filed: Sep. 9, 2013

(51) Int. Cl.
*A01K 89/01* (2006.01)
*A01K 89/015* (2006.01)
*A01K 89/00* (2006.01)

(52) U.S. Cl.
CPC ............ *A01K 89/015* (2013.01); *A01K 89/006* (2013.01)

(58) Field of Classification Search
CPC .. A01K 89/015; A01K 89/016; A01K 89/033
USPC ......................................... 242/255, 317, 263
See application file for complete search history.

(56) References Cited

U.S. PATENT DOCUMENTS

| | | | | |
|---|---|---|---|---|
| 1,439,926 A * | 12/1922 | Teutsch | .......................... | 242/314 |
| 1,637,437 A * | 8/1927 | Case | .............................. | 242/279 |
| 2,010,522 A * | 8/1935 | Lewis | .......................... | 242/260 |
| 2,417,732 A * | 3/1947 | Bland et al. | .................... | 242/255 |
| 2,943,811 A * | 7/1960 | Isbell | .......................... | 242/272 |
| 3,061,232 A * | 10/1962 | Clark | .......................... | 242/292 |
| 3,089,663 A * | 5/1963 | Kirby, Sr. | ...................... | 242/223 |
| 3,166,268 A * | 1/1965 | Clark | .......................... | 242/258 |
| 5,199,682 A * | 4/1993 | James | .......................... | 242/295 |
| 5,480,102 A * | 1/1996 | Sato | .............................. | 242/310 |
| 5,607,117 A * | 3/1997 | Svensson | ...................... | 242/261 |
| 5,947,398 A * | 9/1999 | Yeh | .............................. | 242/295 |
| 6,581,864 B1 * | 6/2003 | Littau | .......................... | 242/268 |
| 7,431,232 B1 | 10/2008 | Kang | | |
| D581,008 S | 11/2008 | Danielsson | | |
| 7,637,450 B2 | 12/2009 | Ordonez et al. | | |
| 7,694,907 B2 | 4/2010 | Chivarov et al. | | |
| 7,798,440 B2 | 9/2010 | Crofoot | | |
| 8,480,022 B2 | 7/2013 | Kang et al. | | |
| 2012/0181365 A1 | 7/2012 | Triller | | |

* cited by examiner

*Primary Examiner* — Emmanuel M Marcelo

(57) ABSTRACT

A fishing reel includes a saddle with an axle that is mountable to a fishing pole. A spool is mounted on the axle and a handle is in mechanical communication with the spool. The handle has an axis of rotation oriented parallel to and offset from an axis of rotation of the spool. The spool is rotated when the handle is rotated so that the spool rotates greater than 1.5 times around the axle for every 1.0 rotations of the handle.

10 Claims, 9 Drawing Sheets

FISHING REEL

BACKGROUND OF THE DISCLOSURE

Field of the Disclosure

The disclosure relates to fishing reels and more particularly pertains to a new fishing reel for use with ice fishing and fly fishing pole.

SUMMARY OF THE DISCLOSURE

An embodiment of the disclosure meets the needs presented above by generally comprising a saddle including an outer wall having an inner surface, an outer surface and a perimeter edge. A mount is attached to the inner surface and extends away therefrom. A foot mounting is attached to the saddle and is positioned adjacent to the perimeter edge. The foot mounting is configured to engage a fishing reel receiver on a fishing pole. An axle is attached to the outer wall and extends away from the inner surface. A spool is mounted on the axle and a spool gear, which is axially aligned with the axle, is mounted to the spool. The spool gear is non-rotationally engaged with the axle. A gear housing is attached to the mount and the spool is positioned between the gear housing and the outer wall. The gear housing extends over the spool gear. A handle is rotatably coupled to the gear housing. A drive gear is mounted within the gear housing and is coupled to the handle. The drive gear rotates when the handle is rotated with respect to the housing. The drive gear is in mechanical communication with the spool gear such that the spool rotates when the handle is rotated. The drive gear has a rotational axis that is spaced from a rotational axis of the spool gear, while the rotational axis of the drive gear and the rotational axis of the spool gear are oriented parallel to each other.

Yet another embodiment of the disclosure meets the needs presented above by generally comprising a saddle including an axle that is configured to be mounted on a fishing pole. A spool is mounted on the axle and a handle is in mechanical communication with the spool. The handle has an axis of rotation oriented parallel to and offset from an axis of rotation of the spool. The spool is rotated when the handle is rotated so that the spool rotates greater than 1.5 times around the axle for every 1.0 rotations of the handle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
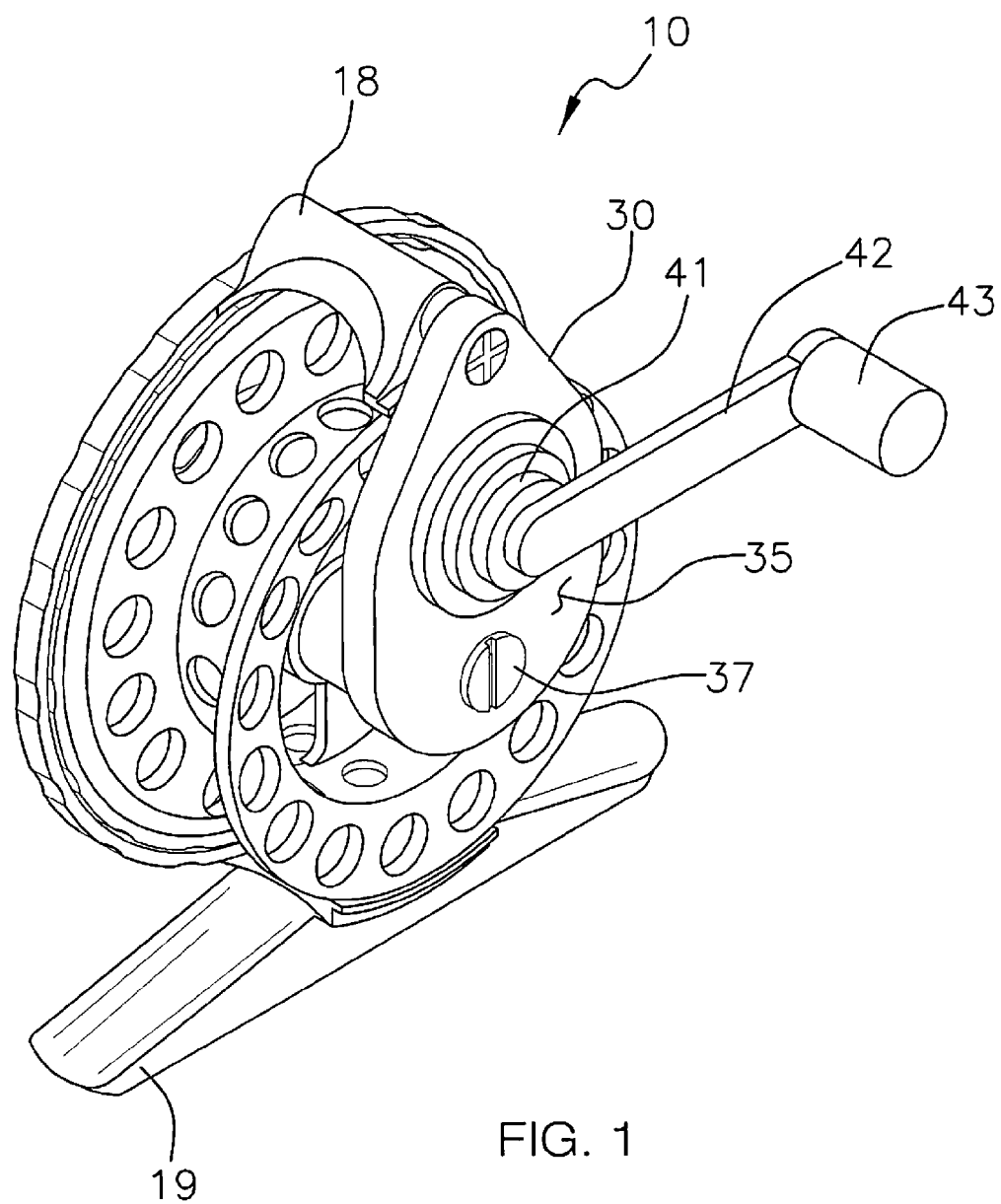
FIG. 1 is a bottom perspective from view of a fishing reel according to an embodiment of the disclosure.
Figure 2:
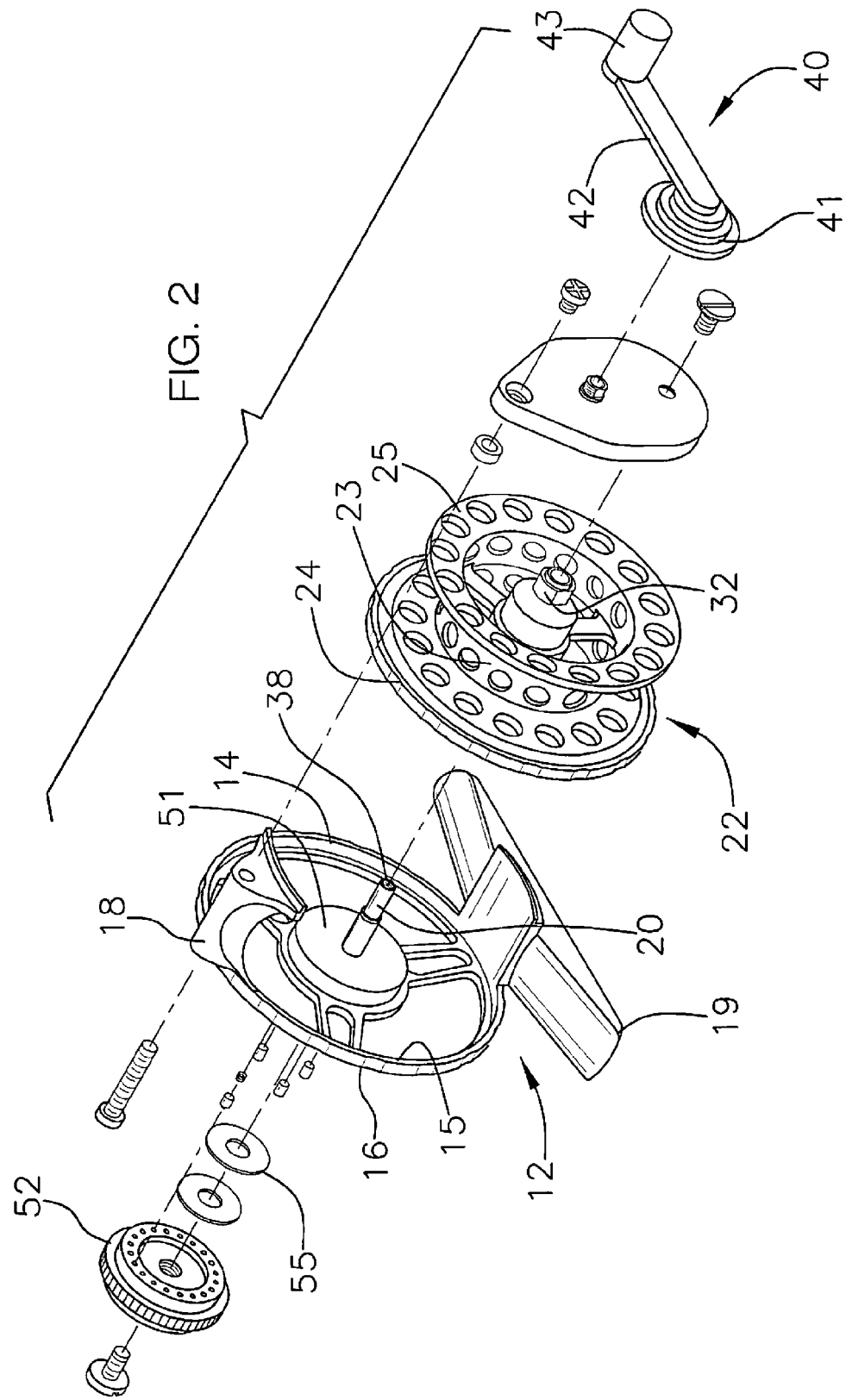
FIG. 2 is a front and bottom perspective exploded view of an embodiment of the disclosure.
Figure 3:
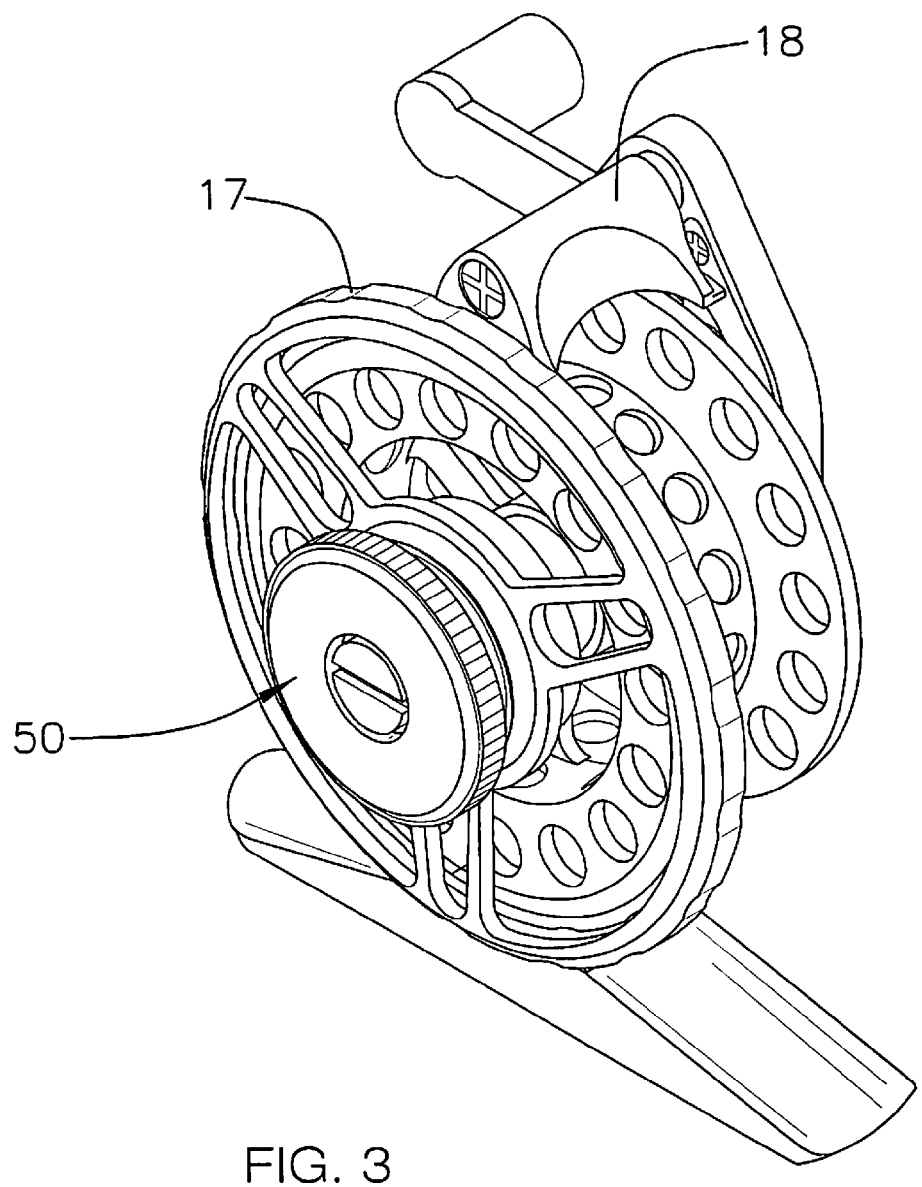
FIG. 3 is a bottom perspective rear view of an embodiment of the disclosure.
Figure 4:
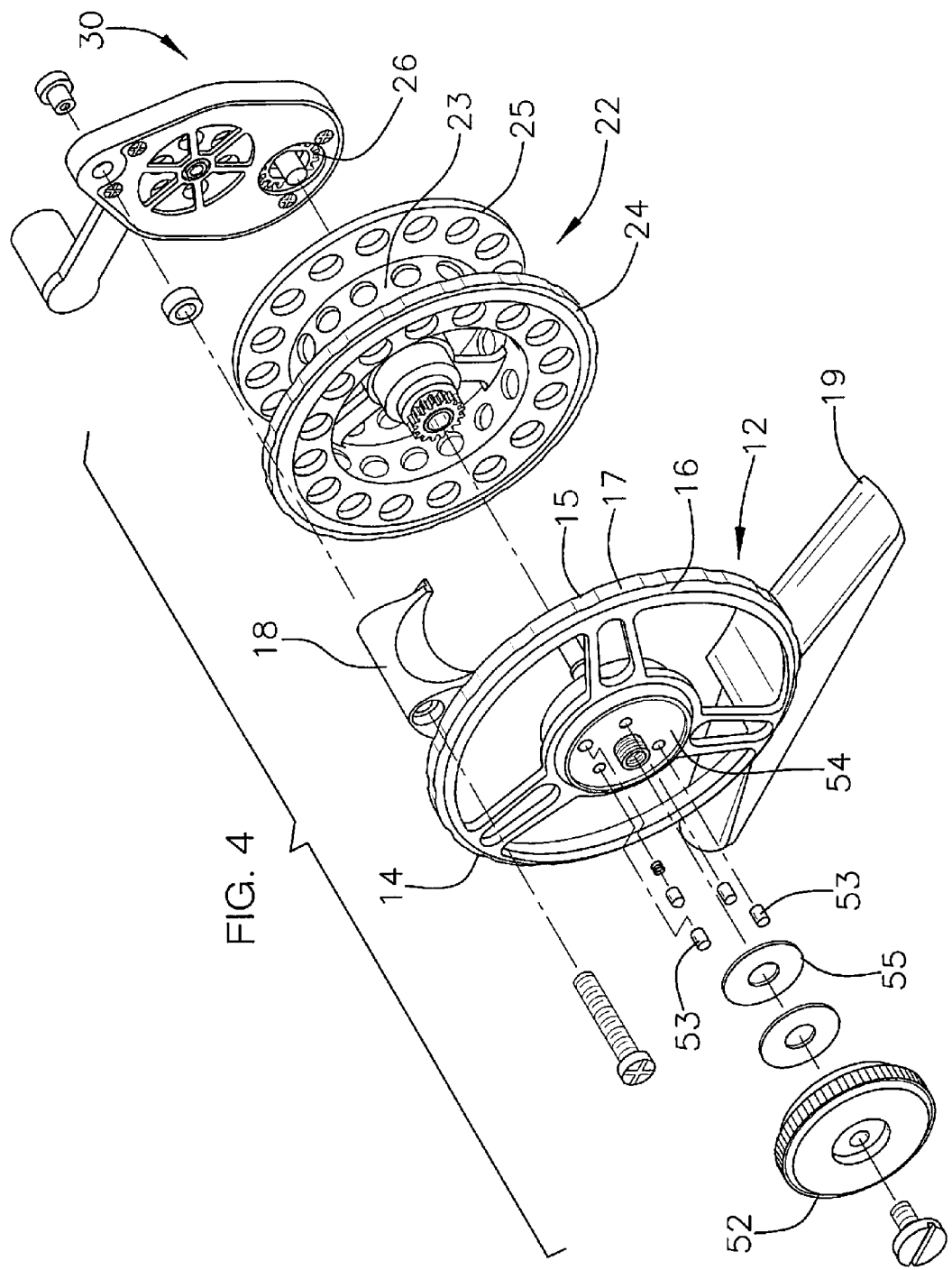
FIG. 4 is a rear and bottom perspective exploded view of an embodiment of the disclosure.

With reference now to the drawings, and in particular to FIGS. 1 through 10 thereof, a new fishing reel embodying the principles and concepts of an embodiment of the disclosure and generally designated by the reference numeral 10 will be described.

As best illustrated in FIGS. 1 through 10, the fishing reel 10 generally comprises a saddle 12 including an outer wall 14 having an inner surface 15, an outer surface 16 and a perimeter edge 17. A mount 18 is attached to the inner surface 15 and extends away therefrom. The mount 18 is positioned adjacent to the perimeter edge 17 and may be fixedly coupled to the outer wall 14 such as by fasteners or it may be non-removably coupled to the outer wall to form a unitary member comprised of a single piece of material. A foot mounting 19 is attached to the saddle 12 and is positioned adjacent to the perimeter edge 17. The foot mounting 19 is conventional to fishing reels and is configured to engage a fishing reel receiver on a fishing pole. The foot mounting 19 is positioned opposite of the mount 18.

An axle 20 is attached to the outer wall 14 and extends away from the inner surface 15. A spool 22 is mounted on the axle 20 and includes a central portion 23 and a pair of lateral walls 24, 25 positioned on opposite sides of the central portion 23. The central portion 23 receives the axle 20. The mount 18 extends over the central portion 23 and each of the lateral walls 24,25. The mount 18 may be pivotally coupled to the outer wall 14 to allow the spool 22 to be removed as needed. A spool gear 26 is mounted, in a removable or fixed fashion as described below, to the spool 22 and is axially aligned with the axle 20 when the spool 22 is positioned on the axle 20. The axle 20 may in turn be axially aligned with the spool 22. The spool gear 26 is non-rotationally engaged with the axle 20.

A gear housing 30 is attached to the mount 18 and the spool 22 is positioned between the gear housing 30 and the outer wall 14. The gear housing 30 extends over the spool gear 26. More particularly, the spool gear 26 may be extended through an opening 31 in the gear housing 30. It should be apparent that the spool gear 26 may be mounted and retained within the gear housing 30, or it may be fixedly coupled to the spool 22 such that when the fishing reel 10 is disassembled, the spool gear 26 remains attached to the spool 22. The spool 22 may include a non-rounded post 32 extending through a similarly shaped aperture 33 in the spool gear 26 to prevent the spool gear 26 from rotating with respect to the spool 22. The gear housing 30 may include a first wall 34, a second wall 35 and a perimeter wall 36 extending therebetween. The first wall 34 includes the opening 31 for either receiving the post 32 if the spool gear 26 is retained within the gear housing 30 or the opening 31 may be large enough to removably receive the spool gear 26 should it be fixedly mounted on the spool 22. A fastener 37 may be extended through the gear housing 30 and into a distal end 38 of the axle 20 with respect to the outer wall 14. The fastener 37 restricts movement of the gear housing 30 with respect to the saddle 12.

A handle 40 is rotatably coupled to the gear housing 30. The handle 40 includes a first section 41 and a second section 42 attached together and oriented approximately perpendicular to each other, wherein the first section 41 is attached to the gear housing 30. A grip 43 is attached to the second section 42 distal to the first section 41 and extends away from the second section 42 in an opposite direction of the first section 41. The grip 43 is rotatable with respect to the second section 42.

A drive gear 46 is mounted within the gear housing 30 and is coupled to the handle 40 such that the first section 41 and the drive gear 46 share an axis of rotation. The drive gear 46 rotates when the handle 40 is rotated with respect to the gear housing 30. The drive gear 46 is in mechanical communication with the spool gear 26 and may be positioned within the same plane as the spool gear 26. By being engaged with the spool gear 26, the spool 22 rotates when the handle 40 is rotated. The drive gear 46 has a rotational axis that is spaced from a rotational axis of the spool gear 26. The rotational axis of the drive gear 46 and the rotational axis of the spool gear 26 are oriented parallel to each other. Further, the rotational axis of the drive gear 46 may be positioned farther from the foot mounting 19 than the rotational axis of the spool 22. The spool gear 26 has a smaller diameter than the drive gear 46 to increase of speed of rotation of the spool 22 relative to the handle 40. Generally, the gear ratio of the drive gear 46 to the spool gear 26 will be between 1.5:1 and 3.5:1.

Figure 5:
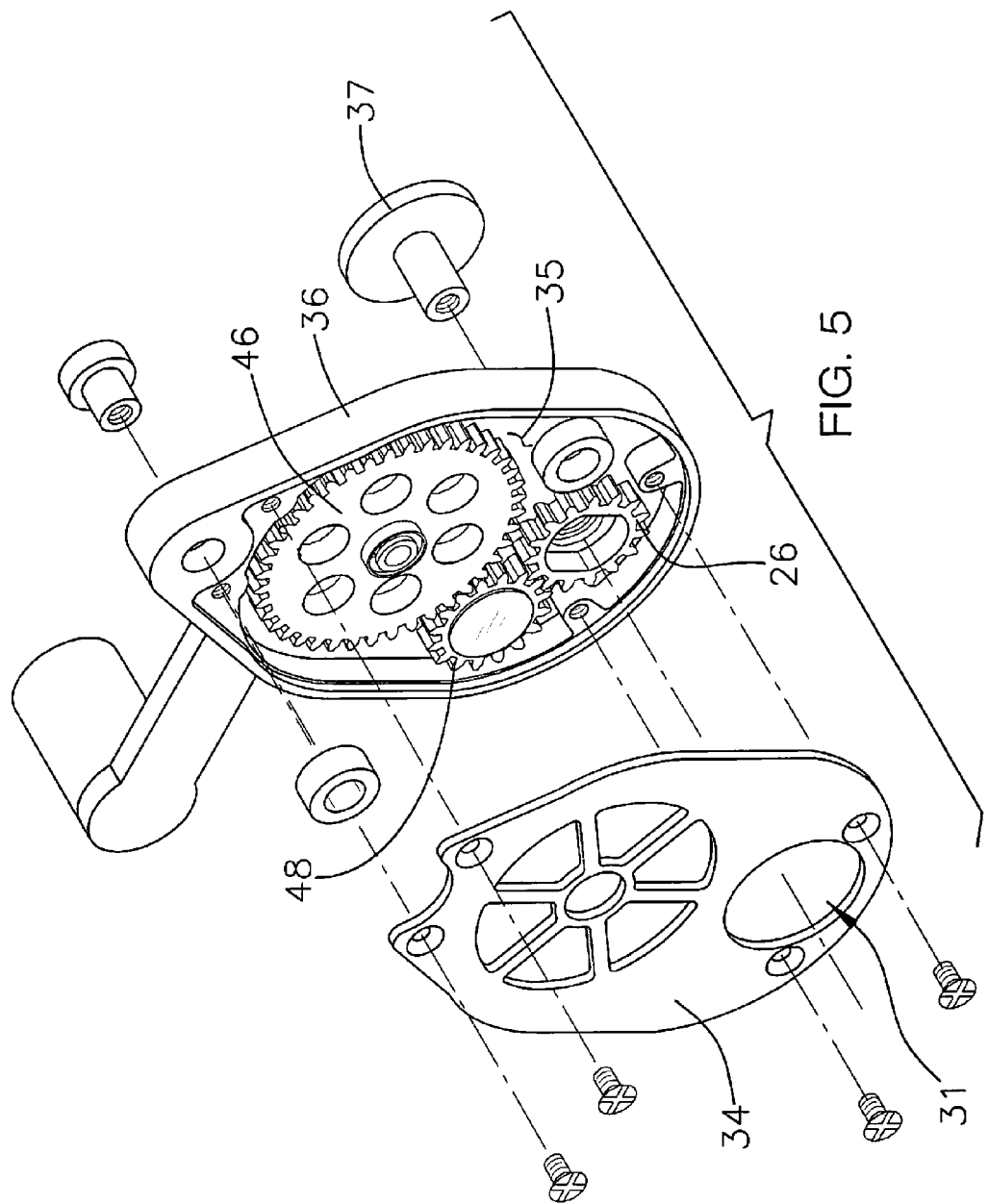
FIG. 5 is a perspective exploded view of an embodiment of the disclosure.
Figure 6:
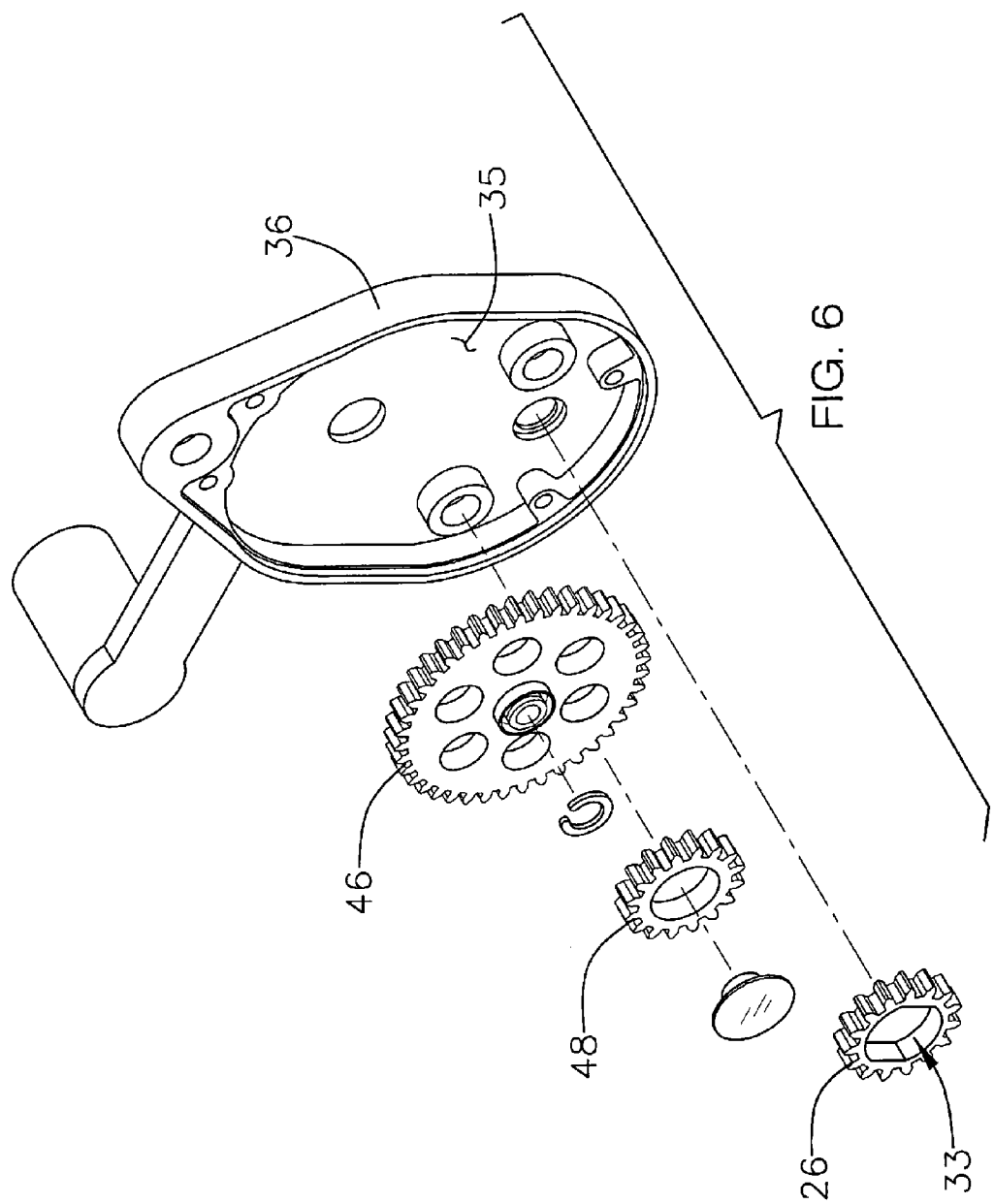
FIG. 6 is a perspective exploded view of an embodiment of the disclosure.
Figure 7:
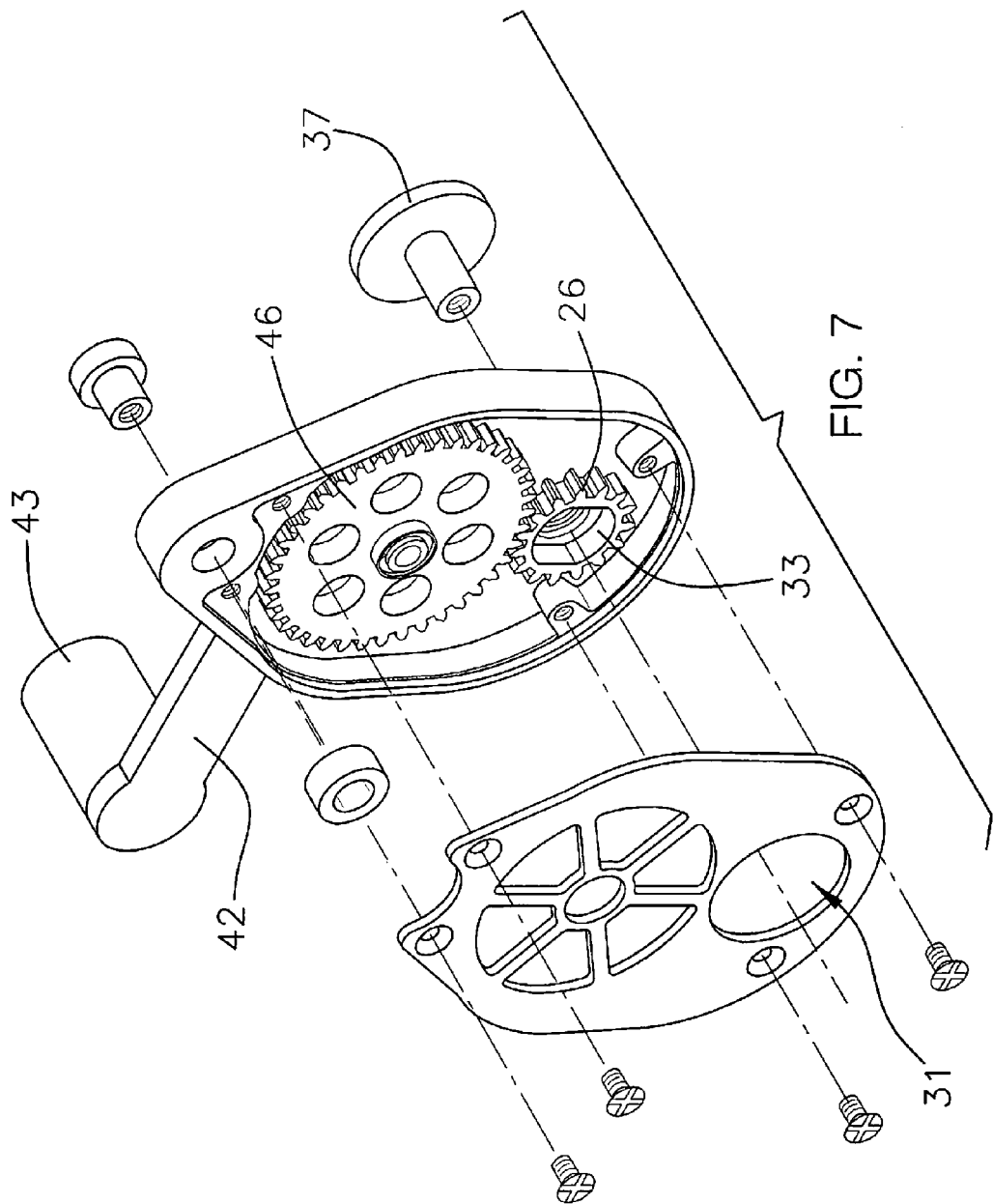
FIG. 7 is a perspective exploded view of an embodiment of the disclosure.
Figure 8:
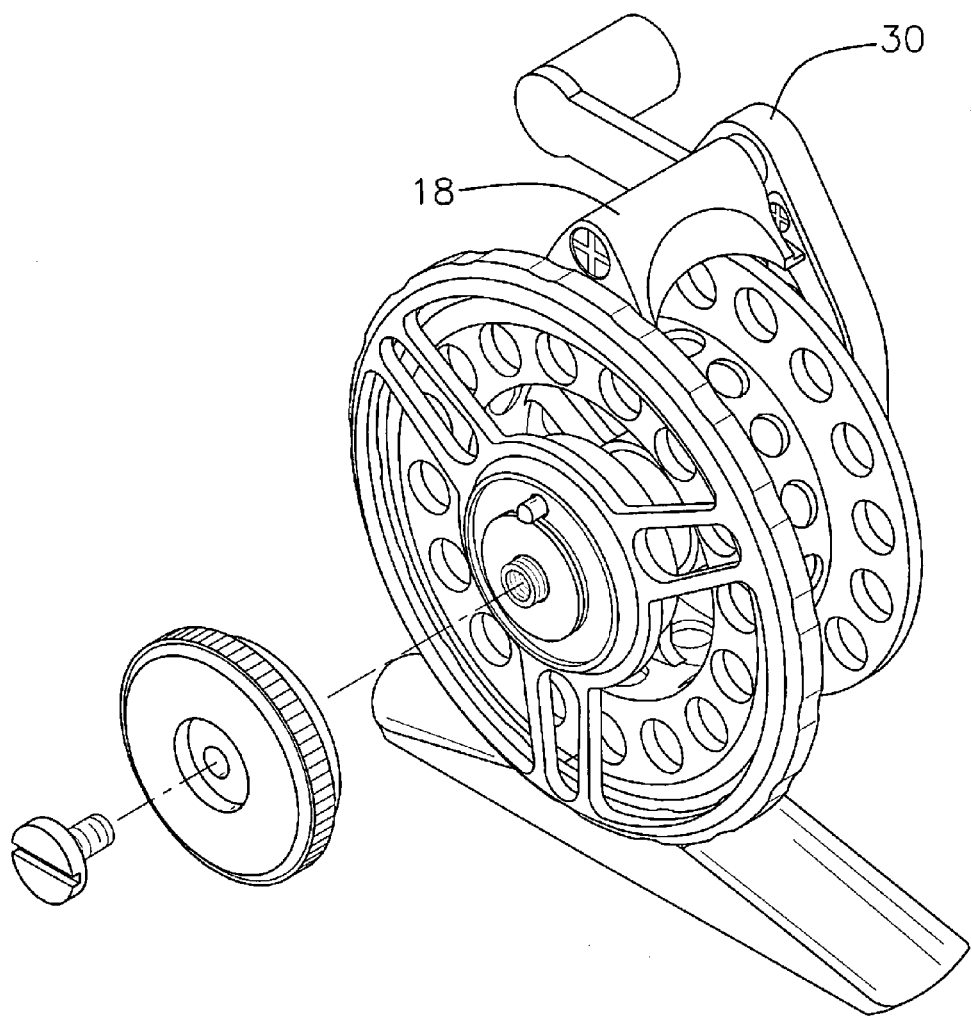
FIG. 8 is a bottom rear perspective view of an embodiment of the disclosure.
Figure 9:
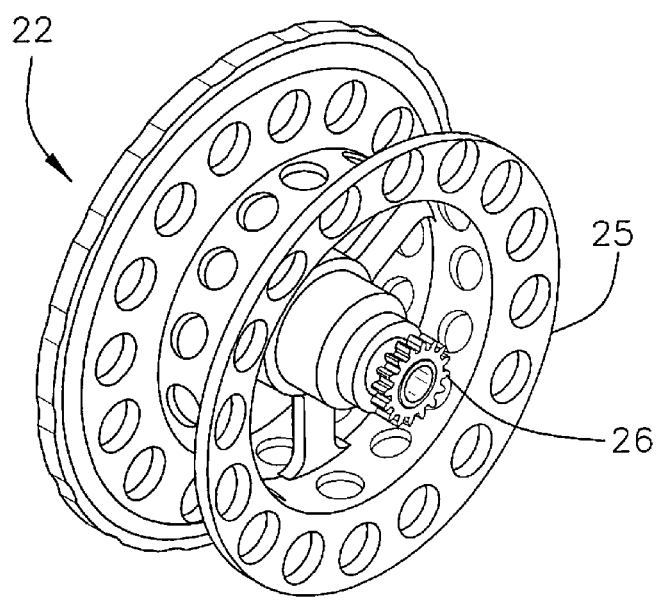
FIG. 9 is a front perspective view of a spool of an embodiment of the disclosure.
Figure 10:
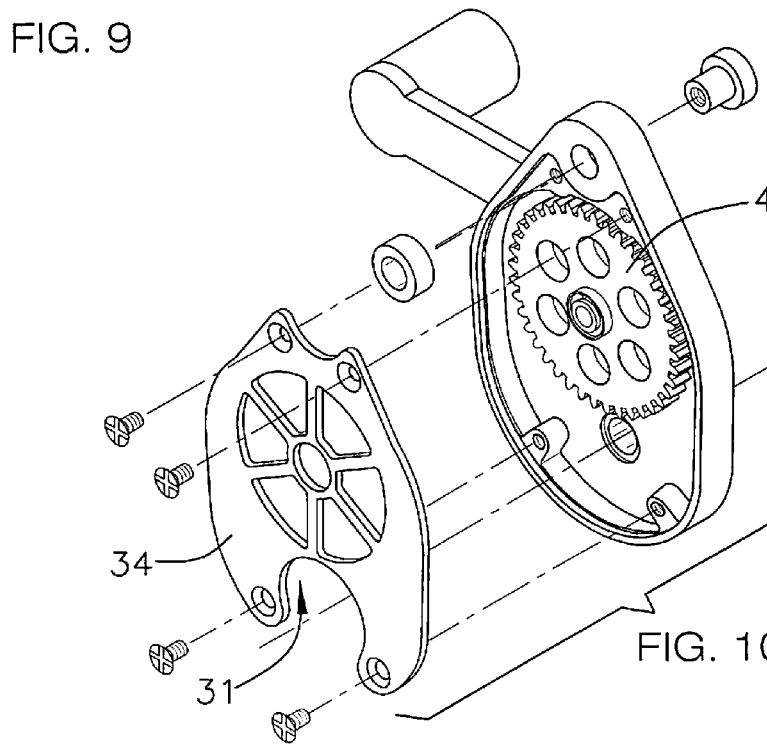
FIG. 10 is a rear perspective view of a gear housing of an embodiment of the disclosure.

As can be seen in FIGS. 5 and 7, the gear housing 30 may include an additional gear, or secondary gear 48, in addition to the drive gear 46. The number of gears to be used will be generally be determined by the type of fishing to be accomplished. Should the angler be ice fishing, no secondary gear 48 will be used as shown in FIG. 7 because the fishing line enters the spool 22 above the central portion 23 (between the central portion 23 and the foot mounting 19). As would be well understood in FIG. 7, the spool 22 and drive gear 46 will rotate in opposite directions with respect to each other. FIG. 5 includes a secondary gear 48 which causes the drive gear 46 and spool gear 48 to rotate in the same direction as each other. Such a configuration would typically be used fly fishing where the fishing line is wound onto the spool 22 from under the central portion 23. In each case it should be understood that the foot mounting 19 would form the uppermost part of the saddle 12 when the saddle 12 is mounted on a fishing rod. Thus, in the embodiment of FIG. 5, the central portion 23 of the spool 22 would be between the foot mounting 19 and the position where the fishing line begins to be wound onto the spool 22.

A generally conventional drag assembly 50 may be mounted on the saddle 12 and engaged with the axle 20 to control ease of rotation of the spool in a direction opposite to that being used to wind fishing line onto the spool. Generally, the axle 19 is allowed to rotate in line winding direction freely as it is actuated by the handle 40 but resists a line unwinding direction when pressure is placed upon an axle mount 51. Such a structure generally includes a biasing member 52 which may be tightened against a washer 55 and pins 53 that are abutted against a mounting plate 54 of the axle mount 51.

In use, the fishing reel 10 is used in a conventional manner, however, the handle 40 has an axis of rotation offset from the rotational axis of the spool 22 allowing for a geared connection between the handle 40 and the spool 22 while retaining the rotational axis of the spool 22 in parallel orientation with the axis of rotation of the handle 40. The geared connection further provides for increasing the speed of rotation of the spool 22 relative to the handle 40. This has particular significance in ice fishing and in fly fishing where a large amount of fishing line is often let out and the angler desires to quickly retrieve the fishing line. Moreover, the position of the handle 40, offset from the rotational axis of the spool 22, is more natural to fly fishing which typically includes a handle mounted on the perimeter edge of the spool itself.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A fishing reel assembly comprising:
a saddle including an outer wall having an inner surface, an outer surface and a perimeter edge, a mount being attached to said inner surface and extending away therefrom;
a foot mounting being attached to said saddle and being positioned adjacent to said perimeter edge, said foot mounting being configured to engage a fishing reel receiver on a fishing pole;
an axle being attached to said outer wall, said axle extending away from said inner surface;
a spool being mounted on said axle;
a spool gear being mounted to said spool and being axially aligned with said axle, said spool gear being non-rotationally engaged with said axle;
a gear housing being attached to said mount, said spool being positioned between said gear housing and said outer wall, said gear housing extending over said spool gear;
a handle being rotatably coupled to said gear housing;
a drive gear being mounted within said gear housing and being coupled to said handle, said drive gear rotating when said handle is rotated with respect to said gear housing, said drive gear being in mechanical communication with said spool gear, wherein said spool rotates when said handle is rotated, said drive gear having a rotational axis being spaced from a rotational axis of said spool gear, said rotational axis of said drive gear and said rotational axis of said spool gear being oriented parallel to each other; and a secondary gear positioned within said gear housing and engaging said drive gear and said spool gear such that rotation of said drive gear in a first direction rotates said spool gear in said first direction.

2. The fishing reel assembly according to claim 1, wherein said mount is positioned adjacent to said perimeter edge, said foot mounting being positioned opposite of said mount.

3. The fishing reel assembly according to claim 1, wherein said spool includes a central portion and a pair of lateral walls positioned on opposite sides of said central portion, said central portion receiving said axle, said mount extending over said central portion and each of said lateral walls.

4. The fishing reel assembly according to claim 1, wherein said handle includes a first section and a second section attached together and oriented approximately perpendicular to each other, a grip being attached to said second section distal to said first section and extending away from said second section in an opposite direction of said first section, said grip being rotatable with respect to said second section.

5. The fishing reel assembly according to claim 1, wherein said drive gear engages said spool gear such that rotation of said drive gear in a first direction rotates said spool gear in a second direction.

6. A fishing reel assembly comprising:
- a saddle including an outer wall having an inner surface, an outer surface and a perimeter edge, a mount being attached to said inner surface and extending away therefrom;
- a foot mounting being attached to said saddle and being positioned adjacent to said perimeter edge, said foot mounting being configured to engage a fishing reel receiver on a fishing pole;
- an axle being attached to said outer wall, said axle extending away from said inner surface;
- a spool being mounted on said axle;
- a spool gear being mounted to said spool and being axially aligned with said axle, said spool gear being non-rotationally engaged with said axle;
- a gear housing being attached to said mount, said spool being positioned between said gear housing and said outer wall, said gear housing extending over said spool gear;
- a handle being rotatably coupled to said gear housing;
- a drive gear being mounted within said gear housing and being coupled to said handle, said drive gear rotating when said handle is rotated with respect to said gear housing, said drive gear being in mechanical communication with said spool gear, wherein said spool rotates when said handle is rotated, said drive gear having a rotational axis being spaced from a rotational axis of said spool gear, said rotational axis of said drive gear and said rotational axis of said spool gear being oriented parallel to each other; and
- a fastener extending through said gear housing and into a distal end of said axle with respect to said outer wall, said fastener restricting movement of said gear housing with respect to said saddle.

7. The assembly of claim 6, further comprising:
- said mount being positioned adjacent to said perimeter edge;
- said foot mounting being positioned opposite of said mount;
- said spool including a central portion and a pair of lateral walls positioned on opposite sides of said central portion, said central portion receiving said axle, said mount extending over said central portion and each of said lateral walls;
- said handle including a first section and a second section attached together and oriented approximately perpendicular to each other, a grip being attached to said second section distal to said first section and extending away from said second section in an opposite direction of said first section, said grip being rotatable with respect to said second section.

8. A fishing reel assembly comprising:
- a saddle including an axle, said saddle being configured to be mounted on a fishing pole;
- a spool being mounted on said axle;
- a handle being in mechanical communication with said spool, said handle having an axis of rotation oriented parallel to and offset from an axis of rotation of said spool; and
- said spool being rotated when said handle is rotated, said spool rotating greater than 1.5 times around said axle for every 1.0 rotation of said handle; and
- a secondary gear being engaged with said drive gear and said spool gear, wherein rotation of said drive gear in a first direction rotates said spool gear in said first direction.

9. The fishing reel assembly according to claim 8, further including:
- a spool gear being engaged to said spool, said spool rotating when said spool gear is rotated; and
- a drive gear being engaged to said handle and being in mechanical communication with said spool gear, a gear ratio of said drive gear to said spool gear being between 1.5:1 and 3.5:1, said spool gear being rotated when said drive gear is rotated by rotation of said handle.

10. The fishing reel assembly according to claim 8, wherein rotation of said drive gear in a first direction rotates said spool gear in a second direction.

* * * * *